Jan. 31, 1961 K. M. POOLE ET AL 2,970,274
SOLID STATE AMPLIFIER
Filed March 21, 1958
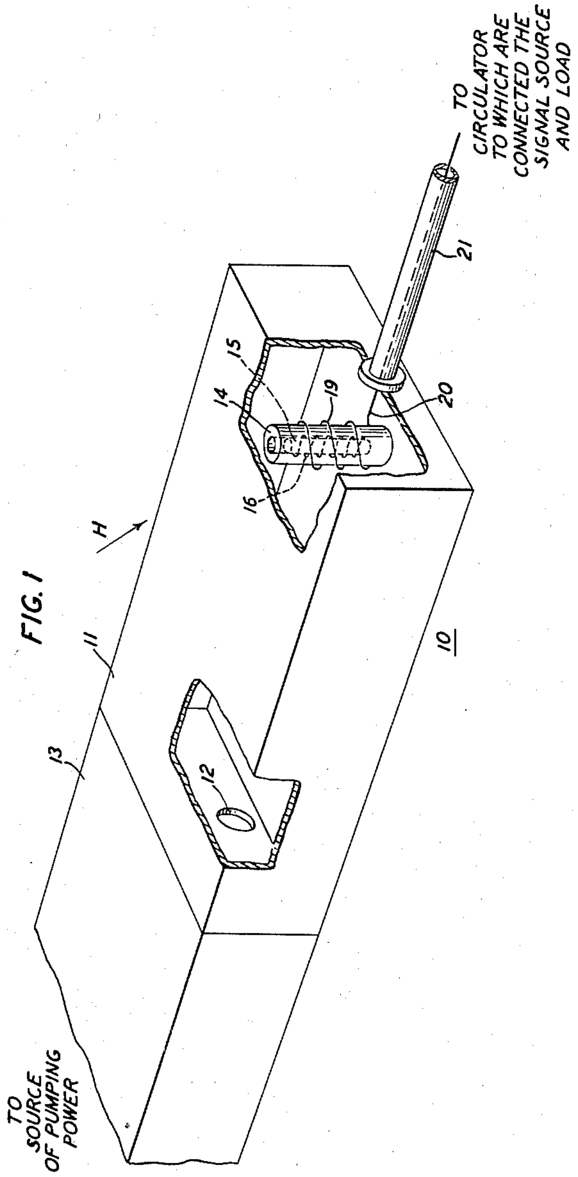
FIG. I
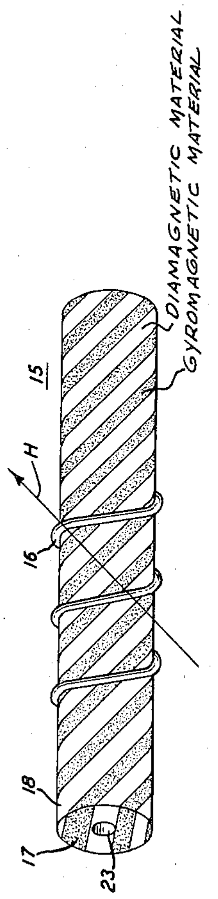
FIG. 2
INVENTORS K. M. POOLE
P. K. TIEN
BY
Arthur J. Torsiglieri
ATTORNEY United States Patent Office 2,970,274
Patented Jan. 31, 1961

2,970,274

SOLID STATE AMPLIFIER

Kenneth M. Poole, New Providence, and Ping K. Tien, Chatham Township, Morris County, N.J., assignors to Bell Telephone Laboratories, Incorporated, New York, N.Y., a corporation of New York Filed Mar. 21, 1958, Ser. No. 722,879

3 Claims. (Cl. 330—5)

This invention relates to a microwave parametric amplifier and more particularly to a parametric amplifier in which the variable reactance element characteristic of the parametric amplifier is inductive.

The general principles of parametric amplifiers are now well understood. See, for example, a paper entitled "Theory of Parametric Amplification Using Nonlinear Reactances," R.C.A. Review, volume XVII, pages 579 through 593. Such amplifiers include a variable reactance element to which are applied both pumping power of a first frequency to vary its reactance correspondingly and signal power of a second frequency for amplification. Additionally, it is important that the amplifier be adapted to propagate one or more additional idler frequencies as will be discussed in more detail hereinafter.

In one of the more promising forms of amplifiers of this kind, the variable reactance element is inductive and comprises an element of a magnetic material, such as a manganese ferrite or a rare-earth iron garnet capable of being biased to gyromagnetic resonance at microwave frequencies. Such inductive element is positioned within an interaction space which exhibits resonances at least at both the pumping and signal frequencies.

The present invention is directed more particularly at various improvements in parametric amplifiers of the last-described form.

Various factors are important in achieving optimum operation in an amplifier of this kind.

First, the power gain available is proportioned to the filling factor of the inductive element, the filling factor being the ratio of the magnetic flux of signal frequency present in the inductive element to the total flux of signal frequency in the interaction space. Accordingly, for high power gains it is desirable that the inductive element fill as fully as possible the region of the interaction space where the signal flux is dense. On the other hand, the amount of pumping power necessary for achieving a desired level of amplification is proportional to the volume of the inductive element. Accordingly, to avoid the necessity of extremely high pumping power levels it is desirable that the volume of the inductive element be small. This, however, tends to be inconsistent with the realization of a large filling factor for the inductive element.

An object of the present invention is to make possible the attainment of each of the above-discussed desiderata to a high degree.

To this end, a feature of the invention is a combination which comprises an inductive element positioned axially within a helical resonator which, in turn, is positioned in a cavity resonator in a region of high magnetic flux density. Advantageously, the helical resonator is resonant at the signal frequency and signal power is applied thereto for amplification, while the cavity resonator is resonant at the pumping frequency and pumping power is applied thereto. In a combination of this kind, since the signal flux is concentrated heavily along the axis of the helical resonator, it is possible to achieve high filling factors with an inductive element of small volume.

Moreover, as an additional advantage, a helical resonator is readily coupled to a signal transmission line. In particular, in a preferred embodiment, the helical resonator is coupled to a surrounding helix which leads to a circulator by means of which input power can be applied to and output power abstracted simultaneously from the helical resonator.

Another factor of importance in economizing in pumping power is the width of the gyromagnetic resonance characteristic of the inductive element at the pumping frequency. In particular, it is advantageous to utilize an inductive element whose gyromagnetic resonance characteristic is narrow.

It has been found characteristic of the magnetic materials of greatest interest for use in the inductive element, such as the manganese ferrites and the rare-earth iron garnets, that minimum line widths are achieved with specimens which are thin discs magnetized in the direction normal to the face of the disc.

Accordingly, another feature of the invention is an inductive element comprising a rod formed alternately of laminae of a magnetic material and laminae of diamagnetic material whereby in a magnetic field normal to the faces of the individual magnetic laminae the rod exhibits substantially the narrow gyromagnetic resonance of the individual laminae.

In an illustrative embodiment of the invention, a rod which comprises alternately thin layers of yttrium-iron garnet, a ferrimagnetic material, and thin layers of synthetic sapphire, a diamagnetic material, is positioned along the axis of a helical conductor of length to be resonant at the signal frequency, which, in turn, is positioned in a cavity resonant at the pumping frequency near one end wall in a region of high magnetic flux. A second contrawound helical conductor surrounds the resonant helix and is connected at one end to a transmission line which leads to a circulator by means of which input signal power is applied to and output signal power is abstracted from the resonant helix. In the embodiment to be described in detail operation is with a pumping frequency twice the signal frequency to avoid the need for providing another resonance in the system. A magnetic field of appropriate magnitude and orientation is also applied to the rod. An amplifier of this kind by appropriate modification of operating conditions may be arranged to amplify at signal frequencies either higher or lower than the pump frequency.

The invention will be better understood from the following more detailed description, taken in conjunction with the accompanying drawing, in which:

Fig. 1 shows in perspective and in a partly cutaway view a paramagnetic amplifier embodying various features of the invention; and Fig. 2 shows in perspective an enlarged view of the inductive element and surrounding helical resonator included in the amplifier shown in Fig. 1.

With reference now to the drawing, the parametric amplifier 10 includes a rectangular cavity 11 which is resonant at the pump frequency. The amplifier 10 will be discussed in detail particularly for the case where the pump frequency is higher than the signal frequency. Power of the pump frequency is supplied to the cavity by way of the aperture 12 in one end wall thereof from a rectangular wave guide 13 which extends to a suitable source of pumping power. The signal circuit assembly advantageously is positioned near the opposite end wall of the cavity, this being a region where the density of the magnetic flux of the pumping power is near its peak.

The signal circuit assembly comprises a quartz cylindrical support post 14 which extends between opposite faces of the cavity. The support post 14 is hollowed out and there is supported axially therein a laminated rod 15 about which is wound a helical conductor 16. As shown on an expanded scale in Fig. 2, the laminated rod 15 comprises alternately laminae of monocrystalline yttrium-iron garnet 17 and laminae of synthetic sapphire 18. As is known to workers in the art, yttrium-iron garnet has been found especially useful for use as the magnetic material in an inductive type of parametric microwave amplifier, because of the narrowness of its gyromagnetic resonance characteristic at microwave frequencies. As previously discussed, such narrowness is important for economizing in the amount of pumping power needed for achieving amplification. Sapphire is an advantageous choice for the diamagnetic laminae because its dielectric constant is nearly the same as that of the yttrium-iron garnet whereby electrical discontinuities along the rod are minimized. The helical conductor 16 is made of length to be resonant at the signal frequency. Advantageously, the helix has a length about three-halves the signal wavelength on the helix, allowance being made for the effect on signal wavelength of the various elements proximate thereto. Advantageously, the helical conductor 16 is also arranged to be resonant at the "idler" frequency, which is the frequency corresponding to the difference in pump and signal frequencies. By choosing the pump frequency to be twice the signal frequency, the idler frequency may be made the same as the signal frequency. It is usually advantageous to avoid a resonance at the frequency corresponding to the sum of the signal and pump frequencies. However, in this instance, this sum frequency is sufficiently high that the helix losses at this frequency prevent any significant resonance. Of course, various other frequency relations are feasible. For example, the pump, signal and idler frequencies can be chosen such that the length of helix 16 corresponds to three-halves the signal wavelength and five-halves the idler wavelength. Alternatively, as will be discussed in more detail below, a resonance at the idler frequency may be provided in the amplifier in other ways.

The support post 14 also supports the coupling helix 19 which is wound therearound in a direction opposite to that of the signal helix 16. This is a well-known technique for increasing the coupling therebetween. The general principles applicable to the design of coupled helices are well known to workers in the microwave amplifier art and so will not be described in detail herein. The coupling helix 19 has one free end and one end which is connected to an extension 20 into the resonant cavity of the inner conductor of the coaxial line 21, the outer conductor of which is electrically connected to the proximate end wall of the cavity 11.

The coaxial line 21 leads to a first arm of a circulator (not shown) of the kind known to workers in the microwave art. A typical circulator is described in copending application Serial No. 554,237, filed December 20, 1955, by H. Seidel. In operation, signal power from the signal source is supplied to a second arm of the circulator for transfer to the helical resonator and output signal power from the helical resonator is supplied to a third arm of the circulator for transfer to the load. It is characteristic of a circulator that it has nonreciprocal transmission properties which make it possible to isolate the signal source from the load in an arrangement of this kind.

There is also applied to the inductive rod 15 by appropriate means (not shown) a uniform D.-C. magnetic field which biases the magnetic laminae therein to the point of gyromagnetic resonance at the frequency of the pumping power. Advantageously, this field is applied at an angle of 45 degrees both with respect to the axis of the signal helix and the magnetic field associated with the pumping power. With this orientation, it is made feasible to have the magnetic fields of the signal and pumping power parallel and to provide a large component of uniform magnetic field normal to the magnetic field of the pumping power and the magnetic field associated with the energy at the idler frequency, which in the instant case is parallel to the magnetic field of the signal. Since it is also desirable that the uniform magnetic field be normal to the faces of the laminae of yttrium-iron garnet, the laminations of rod are arranged to form an angle of 45 degrees with the axis of the signal helix 16 as shown in Fig. 2. In the drawing, the uniform magnetic field is illustrated schematically by the vector H. In general, it is desirable that the applied magnetic field have a component normal to the magnetic fields at the idler and pump frequencies and that the magnetic fields at the pump and signal frequencies have parallel components in the inductive element.

The use of a laminated inductive element has advantages other than that of permitting a narrow resonance characteristic. In particular, there is reduced thereby the tendency of the inductive element to introduce nonreciprocal effects on the propagation properties of the signal helix whereby its efficiency as a resonator is enhanced.

In operation, pumping power supplied by the pumping power source is supplied to the cavity while signal power from the signal source is supplied to the helical resonator. The inductive element serves to provide intermode coupling between the magnetic fields of the pumping power and the signal power whereby the signal power is amplified.

Various modifications are feasible in the amplifier described, the better to adapt it for particular applications. In particular, where power levels are involved on such magnitude that cooling of the inductive element is desirable, it is advantageous to drill a hole 22, as shown in Fig. 2, axially through the inductive element and to flow a coolant therethrough. Since the magnetic flux of the signal power is concentrated close to the helical wire, an axial hole reduces the volume of the element far more than it reduces the filling factor. Moreover, such an axial hole tends to reduce the magnetostatic modes set up in the magnetic laminae and thereby to reduce a potential source of noise.

Similarly as discussed above, where other than degenerate operation is desired, it is important to provide in an amplifier a resonance at at least one idler frequency. In particular, where the signal frequency is lower than the pump frequency it is important to provide a resonance at a frequency equal to the difference between the pump and the signal frequency. Various techniques are feasible for introducing this resonance. As discussed above, one technique is to make the signal helix resonant at both the signal and idler frequencies. Alternatively, the cavity may be made resonant at both the pump and idler frequencies. Additionally, it is feasible to provide that the inductive sample be dimensioned to exhibit a resonance at the idler frequencies in one of its magnetostatic modes.

In amplifiers where it is desired to amplify signals of frequency higher than the pump frequency, it is ordinarily important to provide resonances at two separate idler frequencies. Of these, one idler frequency corresponds to the difference between the pump and signal frequencies and the other idler frequency corresponds to the difference between the pump frequency and the first idler frequency. Resonances at these idler frequencies may be incorporated as resonant modes of the cavity, magnetostatic resonant modes of the inductive elements, resonant modes of the helical resonator, or combinations thereof. In applications where the signal frequency is lower than the pump frequency, it may be convenient to reverse the roles of the resonant cavity and the helical resonator, using the form as the signal resonant structure, and the latter as the pump resonant structure.

From the foregoing, it should be apparent that the novel features set forth may be incorporated into a wide variety of parametric amplifiers. Moreover, it is feasible to incorporate in a particular form of parametric amplifier only some of such novel features. Moreover, it should be clear that the principles described are applicable generally to arrangements involving different relations between pumping and idler frequencies where either a high efficiency resonant circuit or an inductive element of narrow gyromagnetic resonance is desired.

What is claimed is:

1. In combination, a hollow conductive cavity resonant at a pump frequency, means for supplying to said cavity energy of said pump frequency, active means comprising alternately laminae of a material exhibiting gyromagnetic resonance with a narrow line width at said pump frequency and laminae of diamagnetic material, said active means being in the shape of a right circular cylinder and said laminae forming a 45 degree angle with the axis of the cylinder, said active means being positioned where the magnetic flux of the energy of said pump frequency supplied to the cavity is concentrated, means for supplying a steady magnetic field to said active means normal to the laminae and at a 45 degree angle to the axis of the right cylinder for establishing gyromagnetic resonance at said pump frequency therein, a first multiturn helical conductor having its two ends free and wound around said active means with a length to make said conductor resonant both at a signal frequency lower than said pump frequency and at the frequency which is the difference between said pump frequency and signal frequency, the relative orientations of the helical conductor, the steady magnetic field and the cavity being such that in the active material the steady magnetic field has a component perpendicular to the magnetic field at the signal frequency, a component parallel to the magnetic field at the difference frequency and a component parallel to the magnetic field at the pump frequency, a source of input signals of said signal frequency, and a second multiturn helical conductor counterwound and coaxial with said first helical conductor and having one of its ends free and the other connected to said source of input signals.

2. In combination, a hollow conductive cavity resonant at a pump frequency, means for supplying to said cavity energy of said pump frequency, active means capable of exhibiting gyromagnetic resonance with a narrow line width at said pump frequency positioned in a region of said cavity where the magnetic flux of the energy of said pump frequency supplied to the cavity is concentrated, means for supplying a steady magnetic field to said active means for establishing gyromagnetic resonance at said pump frequency therein, a first multiturn helical conductor having its two ends free and wound around said active means with a length to make said conductor resonant both at a signal frequency lower than said pump frequency and at the frequency which is the difference of said pump frequency and signal frequency, the relative orientations of the helical conductor, the steady magnetic field and the cavity being such that in the active material the steady magnetic field has a component perpendicular to the magnetic field of the signal frequency, a component parallel to the magnetic field at the difference frequency and a component parallel to the magnetic field of the pump frequency, a source of input signals of said signal frequency, and a second multiturn helical conductor counterwound and coaxial with said first helical conductor and having one of its ends free and the other connected to said source of input signals.

3. In combination, a hollow conductive cavity resonant at a pump frequency and a first multiturn helical conductor having its two ends free and positioned in said cavity at a region where the magnetic flux of said cavity is concentrated, the length of the conductor being such that the conductor is resonant at the signal frequency, the combination of said cavity and conductor also providing a resonance at the difference between said pump frequency and signal frequency, gyromagnetic means positioned along the axis of the helical conductor and adapted to exhibit gyromagnetic resonance with a narrow line width at the pump frequency, means for supplying a steady magnetic field to the gyromagnetic means for establishing gyromagnetic resonance therein at said pump frequency, the orientations of the steady magnetic field, the cavity and the conductor being such that the steady magnetic field has a component perpendicular to the magnetic field at the signal frequency, a component parallel to the magnetic field at the difference frequency and a component parallel to the magnetic field at the pump frequency, a source of input signals of said signal frequency, and a second multiturn helical conductor counterwound and coaxial with said first conductor and having one of its ends free and the other connected to said source of input signals.

References Cited in the file of this patent

UNITED STATES PATENTS

| | | |
|---|---|---|
| 2,511,610 | Wheeler | June 13, 1950 |
| 2,743,322 | Pierce et al. | Apr. 24, 1956 |
| 2,806,972 | Sensiper | Sept. 17, 1957 |
| 2,811,673 | Kompfner | Oct. 29, 1957 |
| 2,825,765 | Marie | Mar. 4, 1958 |
| 2,850,705 | Chait et al. | Sept. 2, 1958 |
| 2,873,370 | Pound | Feb. 10, 1959 |
| 2,883,629 | Suhl | Apr. 21, 1959 |
| 2,922,125 | Suhl | Jan. 19, 1960 |

FOREIGN PATENTS

| | | |
|---|---|---|
| 674,874 | Great Britain | July 2, 1952 |

OTHER REFERENCES

Dillon, Physical Review, vol. 105, January 15, 1957, pages 759–760.

Ayers et al.: "Journal of Applied Physics," vol. 27, No. 2, February 1956, pages 188–189.

Weiss: "Physical Review," July 1, 1957, page 317.

Farrar: "Journal of Applied Physics," March 1958, pages 425–426.